US009087102B2

(12) United States Patent
Bestgen et al.

(10) Patent No.: US 9,087,102 B2
(45) Date of Patent: *Jul. 21, 2015

(54) ADAPTIVE QUERY PROCESSING INFRASTRUCTURE

(75) Inventors: Robert Joseph Bestgen, Rochester, MN (US); Michael S. France, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/869,509

(22) Filed: Oct. 9, 2007

(65) Prior Publication Data

US 2009/0094192 A1 Apr. 9, 2009

(51) Int. Cl.
*G06F 17/30* (2006.01)
(52) U.S. Cl.
CPC .............................. *G06F 17/30474* (2013.01)
(58) Field of Classification Search
CPC .................... G06F 17/30463; G06F 17/30469; G06F 17/30442; G06F 17/30474
USPC ............ 707/999.002, 999.003, 713, 718, 719
See application file for complete search history.

(56) References Cited

U.S. PATENT DOCUMENTS

| | | | | |
|---|---|---|---|---|
| 5,560,023 A | * | 9/1996 | Crump et al. | 713/323 |
| 5,819,255 A | * | 10/1998 | Celis et al. | 1/1 |
| 6,618,719 B1 | * | 9/2003 | Andrei | 1/1 |
| 6,757,670 B1 | * | 6/2004 | Inohara et al. | 1/1 |
| 6,871,226 B1 | * | 3/2005 | Ensley et al. | 709/224 |
| 6,961,817 B2 | * | 11/2005 | Soejima et al. | 711/114 |
| 6,999,958 B2 | * | 2/2006 | Carlson et al. | 1/1 |
| 7,185,000 B1 | * | 2/2007 | Brown et al. | 707/718 |
| 7,194,451 B2 | * | 3/2007 | Chaudhuri et al. | 1/1 |
| 8,032,522 B2 | * | 10/2011 | Goldstein et al. | 707/718 |
| 2003/0065648 A1 | * | 4/2003 | Driesch et al. | 707/2 |
| 2004/0236727 A1 | * | 11/2004 | Day et al. | 707/3 |
| 2005/0262046 A1 | * | 11/2005 | Day et al. | 707/2 |
| 2006/0004695 A1 | * | 1/2006 | Day et al. | 707/2 |
| 2008/0288473 A1 | * | 11/2008 | Hu et al. | 707/4 |

* cited by examiner

*Primary Examiner* — Monica Pyo
(74) *Attorney, Agent, or Firm* — Craig F. Taylor (57) ABSTRACT

Methods, systems, and computer program products are provided for improving the processing of database queries. Some embodiments include detecting an overly long running query execution plan, stopping execution of the plan, and utilizing the query optimizer to select an alternate plan for execution. Embodiments may utilize system timers which are set with a time limit for the first selected plan, with instructions to re-optimize and initiate selection of an alternate plan when the timer times out. Risky constructs may be located in the first plan and removed from future consideration for executing the query. In some embodiments, the additional overhead for non-problem queries consists of little more than creating and sending a message or setting a timer when starting query execution, and canceling a timer upon successful query processing completion. A secondary thread may be created responsive to detecting a long running query, to supervise selecting an alternate execution plan.

17 Claims, 11 Drawing Sheets

ADAPTIVE QUERY PROCESSING INFRASTRUCTURE

BACKGROUND

1. Technical Field

The field of the invention is data processing, or, more specifically, methods, apparatus, and products for monitoring and managing database queries for improving performance.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Information stored on a computer system is often organized in a structure called a database. A database is a grouping of related structures called 'tables,' which in turn are organized in rows of individual data elements. The rows are often referred to as 'records,' and the individual data elements are referred to as 'fields.' In this specification generally, therefore, an aggregation of fields is referred to as a 'data structure' or a 'record,' and an aggregation of records is referred to as a 'table.' An aggregation of related tables is called a 'database.'

A computer system typically operates according to computer program instructions in computer programs. A computer program that supports access to information in a database is typically called a database management system or a 'DBMS.' A DBMS is responsible for helping other computer programs access, manipulate, and save information in a database.

A DBMS typically supports access and management tools to aid users, developers, and other programs in accessing information in a database. One such tool is the structured query language, 'SQL.' SQL is query language for requesting information from a database. Although there is a standard of the American National Standards Institute ('ANSI') for SQL, as a practical matter, most versions of SQL tend to include many extensions. Here is an example of a database query expressed in SQL:

select*from stores, transactions
where stores.location="Minnesota"
and stores.storeID=transactions.storeID This SQL query accesses information in a database by selecting records from two tables of the database, one table named 'stores' and another table named 'transactions.' The records selected are those having value "Minnesota" in their store location fields and transactions for the stores in Minnesota. In retrieving the data for this SQL query, an SQL engine will first retrieve records from the stores table and then retrieve records from the transaction table. Records that satisfy the query requirements then are merged in a 'join.'

In many systems, the SQL queries are parsed, a logical plan created, and at least one, often multiple physical plans created for executing the logical plan to execute the SQL query. The multiple physical plans arrive at the same correct output, but can take greatly varying times to arrive at that output, depending on which plan is selected for execution. The best plan to execute is usually the plan having the lowest/cheapest expected cost, typically selected by the query optimizer.

In database query processing, the algorithms used by the query optimizer to implement the query are based on the 'best' plan that the optimizer selects using statistics over the underlying tables and columns. This is called the cost based model and is the defacto standard for databases.

One problem with this mechanism is that the chosen plan is selected based on the lowest expected cost. However, in practice, this selection process sometimes chooses a very inferior plan primarily because the available statistics fail to match reality during this execution. The resulting long running queries can be a major source of user frustration, troubleshooting, and support costs.

Current solutions that attempt to correct plans include two main approaches. In the first approach, performance feedback from the actual execution of the query is used for the next run of the query. While this does have some applications, it does nothing to correct the problem query currently running. The second approach is to embed some self-modifying techniques within the query executable itself, primarily the ability to alter join order execution under limited conditions. This second approach also has some applications. Unfortunately, it introduces optimization and runtime overhead into all queries in order to catch the few that have problems. Also, its solution space is quite limited. Methods having a different, low overhead approach would be most beneficial.

In addition, there are also techniques to detect longer running queries, but they primarily provide only reporting capability and/or potentially the ability to simply kill the query. Correcting the problem is still left to user intervention. Improved methods and systems for handling such problems would be beneficial.

SUMMARY

Methods, systems, and computer program products are provided to offer a low overhead way to asynchronously detect problem queries that are not processing as expected and to correct the situation. Problem queries may also be referred to as runaway queries or long running queries. Some embodiments combine the flexibility of a cost based optimizer with some basic policies that identify potential problem areas. Embodiments of the invention can provide a solution that improves the customer experience without adding additional pressure to optimization time, or adding to the complexity of the database engine.

Some embodiments require that a user job initially create a message queue to receive messages relating a problem query. For each query execution, these embodiments require little more than creating and sending a timed message or set a timer when starting the query execution, followed by canceling a timer upon successful query execution completion. In this way, the added overhead for non-problem queries is kept very low. Some embodiments utilize a secondary thread to handle problem queries when they occur. This secondary thread may also be referred to as a guardian thread or a maintenance thread. In some embodiments, this secondary thread is created only in response to the occurrence of a problem query. In this way, the overhead of creating the secondary thread is incurred only when needed, not for every query regardless of the existence of a problem.

In some embodiments, problem constructs, also referred to as risky constructs, may be known to the system. After detecting a problem query, the plan that is executing and resulting in the problem can have the risky construct identified and removed from future consideration to execute the current query. In response to a first selected plan taking too long to execute, the query can be re-costed, the currently running query cancelled, and a second plan selected and executed.

In one embodiment method for managing execution of a database query, the method includes initiating execution of a first query plan for executing the database query, stopping execution of the first query plan, and initiating execution of a second query plan for executing the database query. Stopping execution of the first plan and executing the second plan can be responsive to the first query plan taking too long to complete. Some such methods also include setting a timer having a time relating to an expected execution time of a first query plan for executing the database query. The first query plan taking too long to complete can be determined at least in part by the timer timing out. Methods may also include removing at least part of the first plan from future consideration to execute the database query. Risky constructs used in the first plan may be identified and removed from future consideration for executing the database query.

In some methods, setting the timer includes making a call to an operating system timer function. The timer may be deactivated responsive to completion of the first query plan completion. Some methods also include executing a thread to supervise stopping the first query plan execution and the initiating the second query plan execution, where the thread is created responsive to the first query plan taking too long to complete. A method may include searching the first plan to identify at least one problem construct, and revising the set of plans responsive to the at least one found problem construct prior to selecting the second plan from the set of plans.

The functionality to handle queries taking too long to complete can create some additional processing overhead even for non-problem query processing. In some methods, the additional processing overhead for executing each non-problem query includes creating and sending a timer message and canceling a timer. In some such methods, the additional processing overhead for executing each non-problem query consists of little more than creating and sending a timer message and canceling a timer.

Some embodiments of the present invention also include a system for processing database queries, the system including a computer processor, and a computer memory operatively coupled to the computer processor. The computer memory can have disposed within it computer program instructions capable of executing the various methods described in the present application. Also provided is a computer program product for processing database queries, the computer program product disposed in a computer readable signal bearing medium. The computer program product includes computer program instructions capable of executing the various methods described in the present application.

The foregoing and other features and aspects of the invention will be apparent from the following more particular descriptions of exemplary embodiments of the invention as illustrated in the accompanying drawings, wherein like reference numbers generally represent like parts of exemplary embodiments of the invention.

DETAILED DESCRIPTION OF EXEMPLARY EMBODIMENTS

Figure 1:
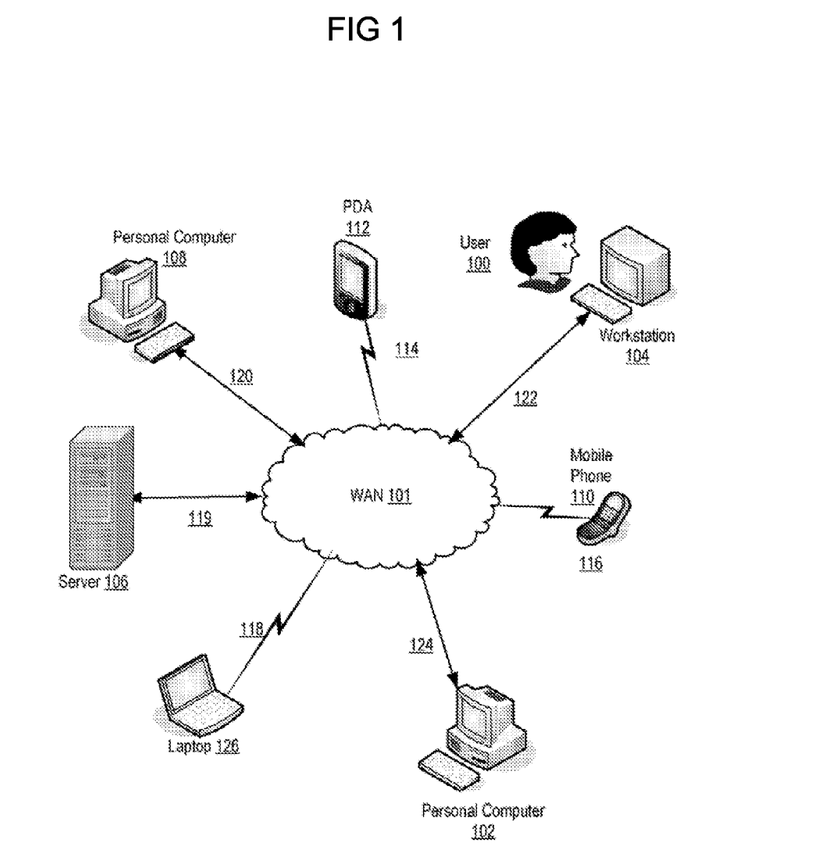
FIG. 1 is a network diagram of a system for processing database queries according to embodiments of the present invention.

FIG. 1 depicts an exemplary data processing system capable of processing database queries for query processing according to embodiments of the present invention. The system of FIG. 1 includes a number of computers connected for data communications in networks. Each of the computers of the system of FIG. 1 may have installed upon it a database management system capable of processing database queries in accordance with the present invention. The data processing system of FIG. 1 includes wide area network ("WAN") 101. The network connection aspect of the architecture of FIG. 1 is only for explanation, not for limitation. In fact, systems for processing database queries according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary devices including a PDA 112, a computer workstation 104, a mobile phone 110, personal computer 102, a laptop 126, a server 106, and another personal computer 108 are connected to WAN 101. The network-enabled mobile phone 110 connects to WAN 101 through wireless link 116, the PDA 112 connects to network 101 through wireless link 114 and the laptop 126 connects to the network 101 through a wireless link 118. In the example of FIG. 1, the personal computer 108 connects through a wireline connection 120 to WAN 101, the computer workstation 104 connects through a wireline connection 122 to WAN 101, the personal computer 108 connects through a wireline connection 124 to WAN 101, and the server 106 connects through a wireline connection 119 to WAN 101. In the system of FIG. 1, exemplary devices 120, 108, 112, 104, 106, 110, 126, and 102 support a database management system capable of processing database queries and interacting with a user 100.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1

Figure 2:
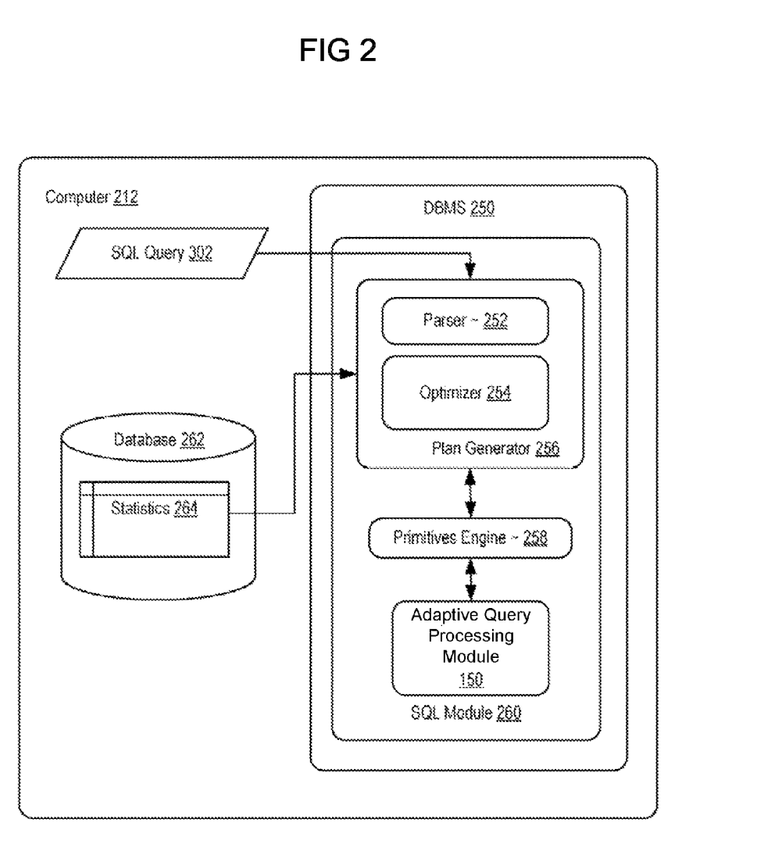
FIG. 2 is a block diagram of an exemplary system for processing database queries in accordance with the present invention according to embodiments of the present invention.

FIG. 2 is a block diagram of an exemplary system for processing database queries in accordance with the present invention according to embodiments of the present invention. The system of FIG. 2 includes a computer 212 having installed upon it a database management system ('DBMS') 250. DBMS 250 administers access to the contents of the database 262. The DBMS 250 includes an SQL module 260. The SQL module is implemented as computer program instructions that execute a SQL query 302.

The exemplary SQL module 260 of FIG. 2 also includes an exemplary plan generator 256. Each SQL query is carried out by a sequence of database operations specified as a plan. The plan generator of FIG. 2 is implemented as computer program instructions that create a plan for a SQL query. A plan is a description of database functions for execution of an SQL query. Taking the following SQL query as an example:

select*from stores, transactions
where stores.storeID=transactions.storeID, plan generator 256 may generate the following exemplary plan for this SQL query:

tablescan stores
join to
index access of transactions

This plan represents database functions to scan through the stores table and, for each stores record, join all transactions records for the store. The transactions for a store are identified through the storeID field acting as a foreign key. The fact that a selection of transactions records is carried out for each store record in the stores table identifies the join function as iterative.

The exemplary plan generator 256 of FIG. 2 includes a parser 252 for parsing the SQL query. Parser 252 is implemented as computer program instructions that parse the SQL query. A SQL query is presented to SQL module 260 in text form, the parameters of an SQL command. Parser 252 retrieves the elements of the SQL query from the text form of the query and places them in a data structure more useful for data processing of an SQL query by an SQL module.

The exemplary plan generator 256 also includes an optimizer 254 implemented as computer program instructions that optimize the plan in dependence upon database management statistics 264. Optimizer 254 optimizes the execution of SQL queries against DBMS 250. Optimizer 254 is implemented as computer program instructions that optimize execution of a SQL query in dependence upon database management statistics 264. Database statistics are typically implemented as metadata of a table, such as, for example, metadata of tables of database 262 or metadata of database indexes. Database statistics may include, for example:

histogram statistics: a histogram range and a count of values in the range,
frequency statistics: a frequency of occurrence of a value in a column, and
cardinality statistics: a count of the number of different values in a column.

These three database statistics are presented for explanation only, not for limitation.

The exemplary SQL module 260 of FIG. 2 also includes a primitives engine 258 implemented as computer program instructions that execute primitive query functions in dependence upon the plan. A 'primitive query function,' or simply a 'primitive,' is a software function that carries out actual operations on a database, retrieving records from tables, inserting records into tables, deleting records from tables, updating records in tables, and so on. Primitives correspond to parts of a plan and are identified in the plan. Examples of primitives include the following database instructions:

retrieve the next three records from the stores table into hash table H1
retrieve one record from the transactions table into hash table H2
join the results of the previous two operations
store the result of the join in table T1

The SQL module 260 of FIG. 2 also includes an adaptive query processing module 150. The adaptive query processing module 150 of FIG. 2 is capable of processing database queries according to the present invention. The adaptive query processing module 150 includes computer program instructions capable of identifying poorly performing queries; substituting an alternate plan to execute the query; and executing the query using the alternate plan.

Figure 3:
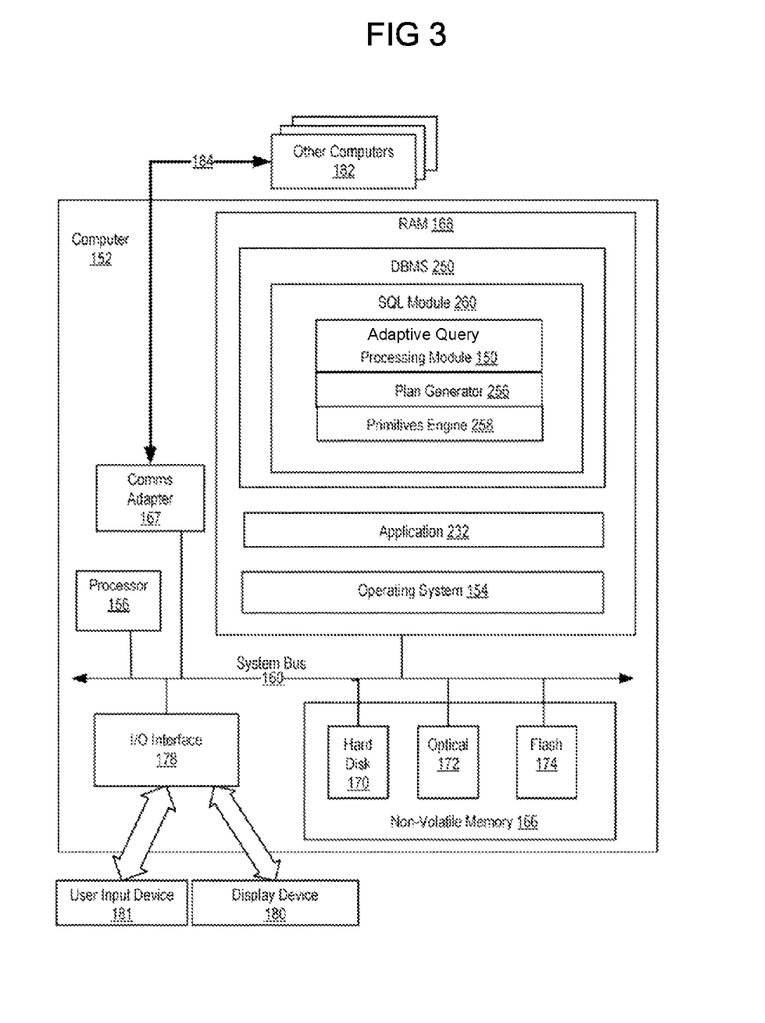
FIG. 3 is a block diagram of automated computing machinery comprising a computer useful in processing database queries in accordance with the present invention.

FIG. 3 is a block diagram of automated computing machinery comprising a computer 152 useful in processing database queries in accordance with the present invention according to embodiments of the present invention. The computer 152 of FIG. 3 includes at least one computer processor 156 or 'CPU' as well as random access memory 168 ("RAM"). Stored in RAM 168 is database management system 250. The database management system 250 of FIG. 3 includes an SQL module 260, which in turn includes a plan generator 256 and a primitives engine 258.

The SQL module 260 of FIG. 3 also includes an adaptive query processing module 150. The adaptive query processing module 150 was described with respect to FIG. 2. Also stored in RAM 168 is an application 232, a computer program that uses the DBMS 250 to access data stored in a database. Also stored in RAM 168 is an operating system 154. Operating systems useful in computers according to embodiments of the present invention include Unix, Linux, Microsoft NT™, i5OS, and many others as will occur to those of skill in the art. Operating system 154, DBMS 250, and application 154 in the example of FIG. 3 are shown in RAM 168, but many components of such software typically are stored in non-volatile memory 166 also.

The computer 152 of FIG. 3 includes non-volatile computer memory 166 coupled through a system bus 160 to processor 156 and to other components of the computer. Non-volatile computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The exemplary computer 152 of FIG. 3 includes a communications adapter 167 for implementing connections for data communications 184, including connections through networks, to other computers 182, including servers, clients, and others as will occur to those of skill in the art. Communications adapters implement the hardware level of connections for data communications through which local devices and remote devices or servers send data communications directly to one another and through networks. Examples of communications adapters useful according to embodiments of the present invention include modems for wired dial-up connections, Ethernet (IEEE 802.3) adapters for wired LAN connections, and 802.11b adapters for wireless LAN connections.

The example computer of FIG. 3 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 4:
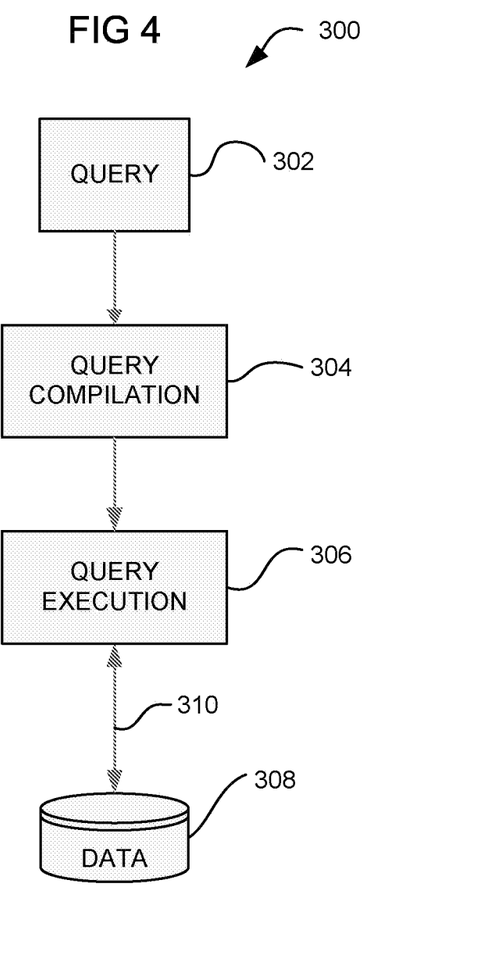
FIG. 4 is a high level flow chart of a method according some embodiments of the present invention.

FIG. 4 illustrates a method 300 for processing an SQL query. A query 302, for example an SQL query, is received. The query can be compiled as indicated 304, and executed at 306. Query execution 306 can both write data to data store 308 and read data from data store 308, as indicated at 310.

Figure 5:
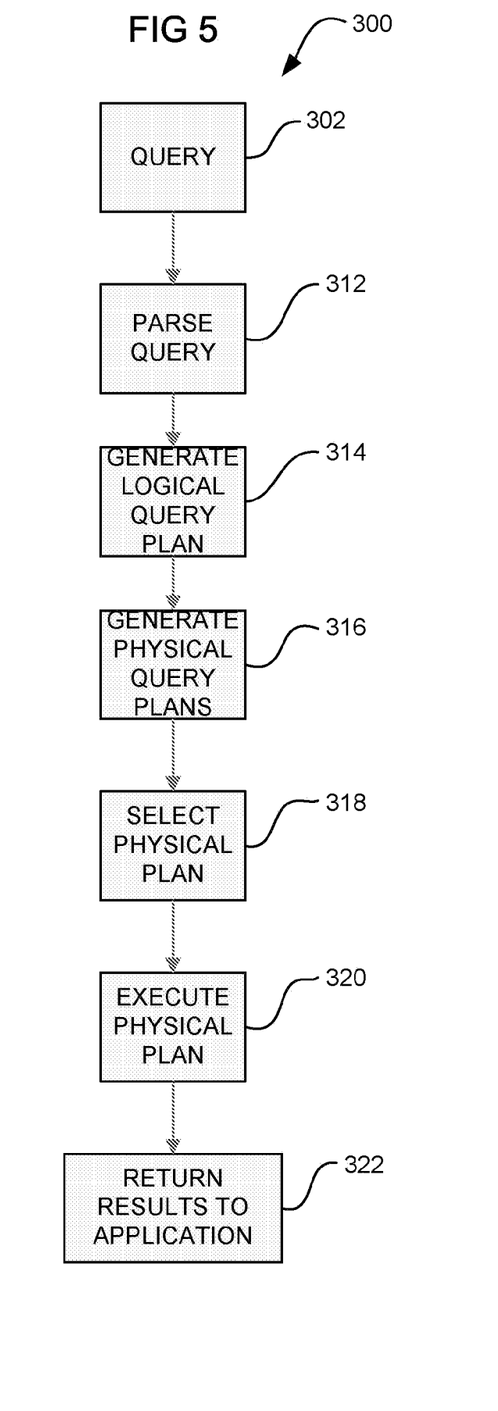
FIG. 5 is a more detailed view of the method of FIG. 4, showing the results of SQL handling when problems are not encountered.

FIG. 5 is a more detailed view of method 300 of FIG. 4. Method 300 can include query 302 being parsed in parse query step 312 and a logical query plan generated in step 314. The results of the logical query plan can be used to generate multiple, logically equivalent physical query plans in step 316. One of the logical query plans, likely the lowest cost plan, can be selected for execution in step 318. The selected physical plan can be executed in step 320 and the results of the query returned to the application in step 322.

Figure 6:
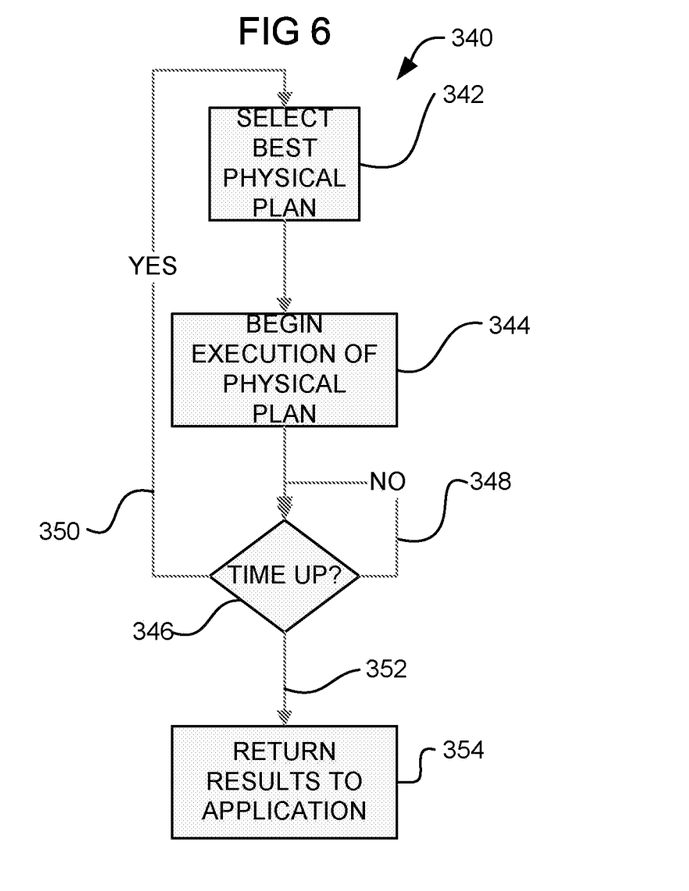
FIG. 6 is a high level flow chart of a method according to some embodiments of the invention, illustrating a simplified view of some aspects of the invention.

FIG. 6 illustrates a method 340 incorporating some aspects of an embodiment of the present invention. Method 340 can operate on a set of generated physical plans, for example physical plans generated by step 316 of FIG. 5. The execution of the selected physical plan can be begun in step 344, with the execution time of the selected plan checked periodically in step 346. If the preset maximum allowed time for the selected plan execution has been reached, then branch 350 is taken at step 346, to select another physical plan to execute at step 342, preferably not the plan currently being executed. If the maximum execution time has not been reached, then branch 348 is taken at step 346, Ultimately path 352 may be taken to execute step 354, in which the query processing results are returned to the application. FIG. 6 is a simplified illustration, with a more detailed illustration of one method being shown in FIG. 8.

Figure 7:
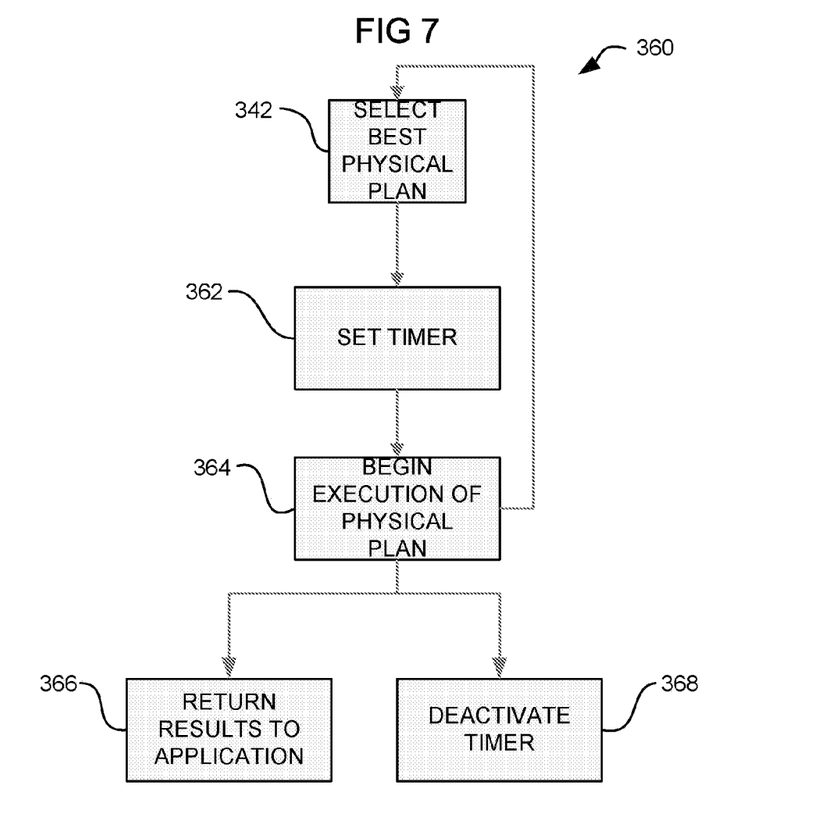
FIG. 7 is a high level flowchart of one implementation of part of the method of FIG. 6, including setting a timer.

FIG. 7 illustrates another aspect of an embodiment method 360, including implementing the time-up step 346 of method 340 in FIG. 6. Method 360 can include selecting a best physical plan step 342, as described with respect to FIG. 6. An estimated or maximum time allowed for execution of the selected physical plan can be retrieved and used to set a timer in step 362. Execution can be begun in step 364. When execution of the selected physical plan is complete, the timer can be deactivated in step 368 and the query processing results returned to the application in step 366. Not shown in FIG. 7 is the result of the timer timing out, which would result in other steps being taken. These other steps can include checking the current plan being executed, putting the current plan into a safe state, selecting another plan, re-costing current plans in light of the new information, and the like.

Figure 8:
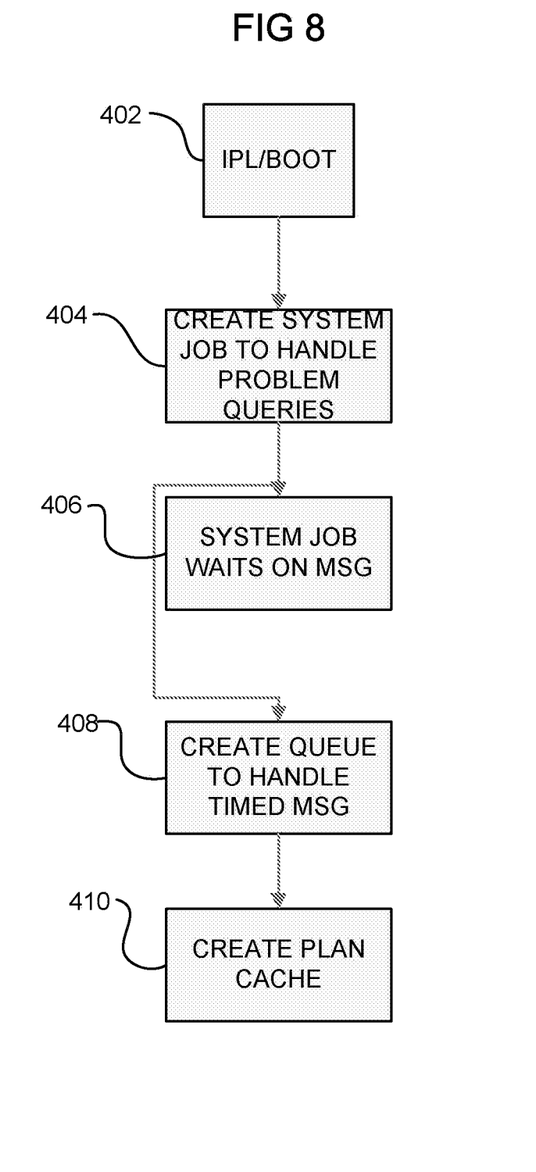
FIG. 8 is a high level flow chart of a method including actions that can be taken upon system startup.
Figure 9:
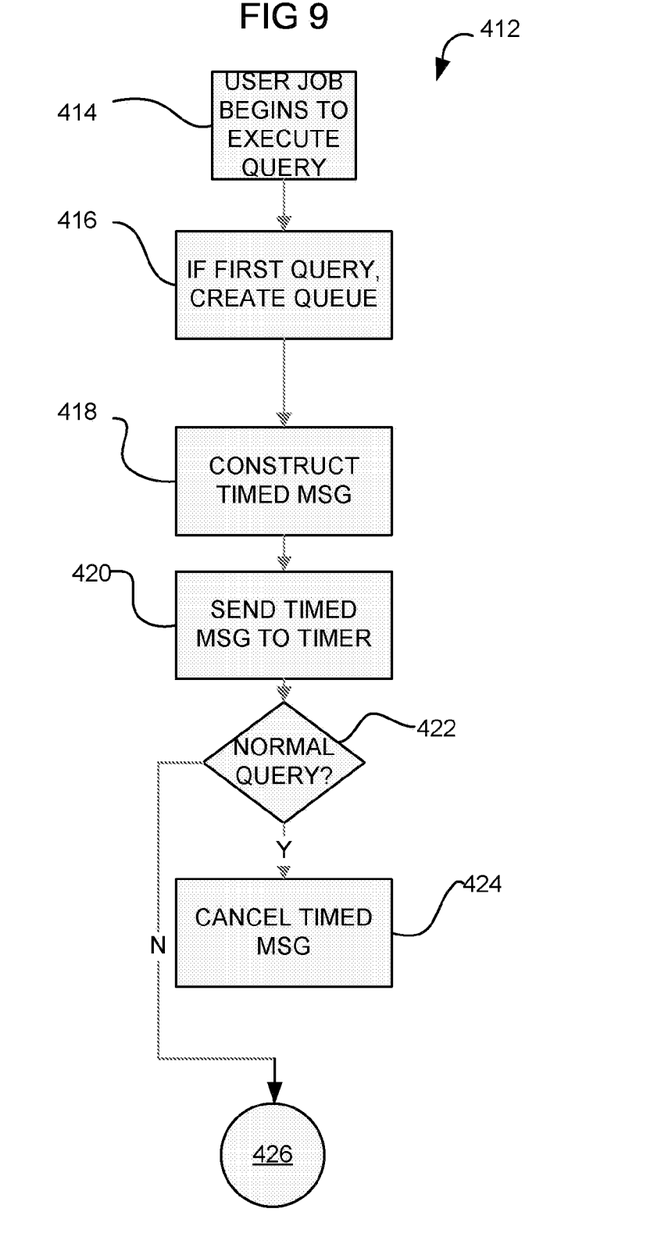
FIG. 9 is a high level flow chart of a method including actions that can be taken when a user job executes a DB query.
Figure 10:
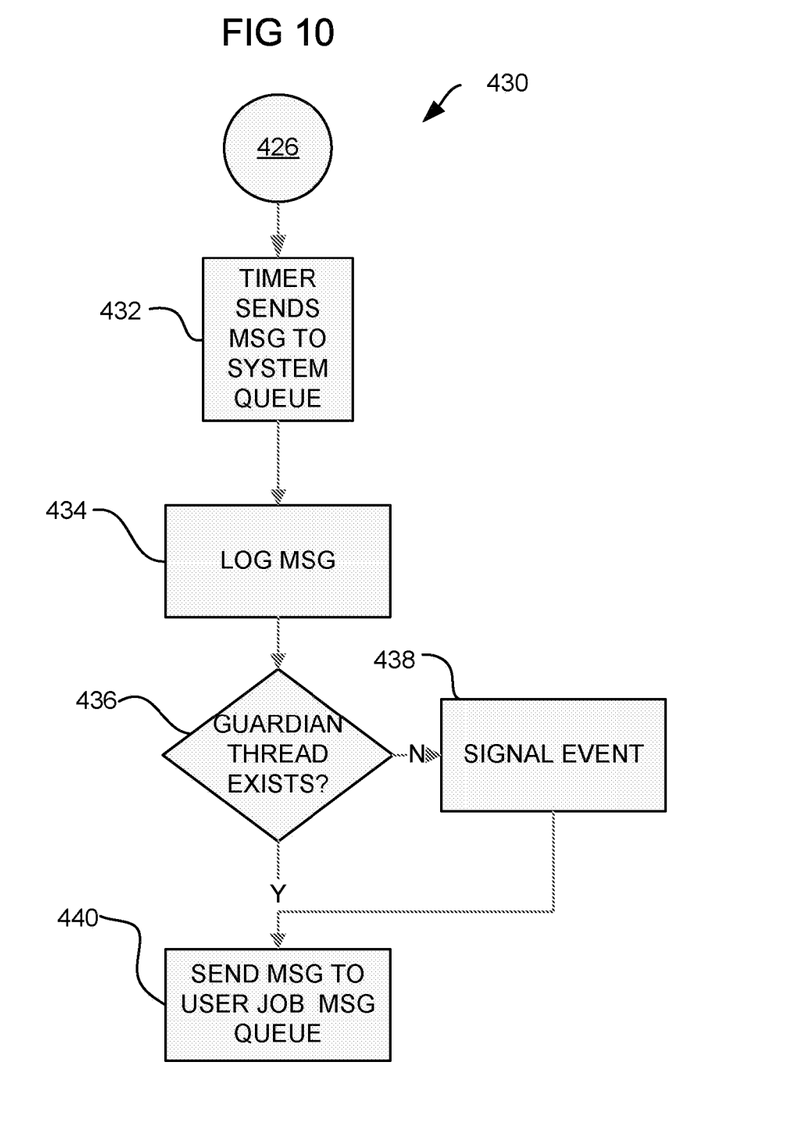
FIG. 10 is a high level flow chart of a method including actions that can be taken after the actions of FIG. 9, when the DB query of FIG. 9 is determined to be a problem query.
Figure 11:
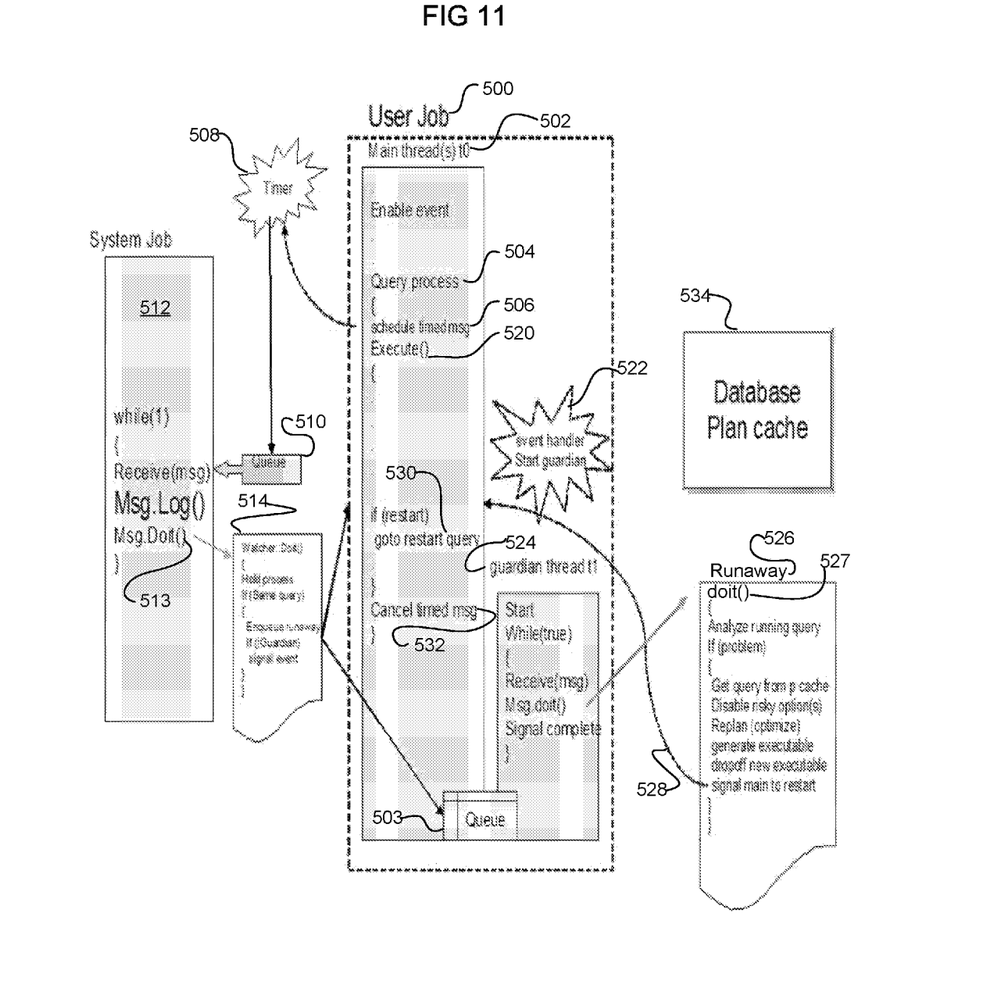
FIG. 11 is a more detailed, system diagram showing an implementation of one embodiment of the present invention, including setting a timer as in FIG. 7.

FIGS. 8-10 may or may not be read by referring also to referring to FIG. 11 when reading the text associated with FIGS. 8-10. This text sometimes refers to reference numerals beginning with number 500, which are used in FIG. 11 to illustrate one example of the invention. The high level aspect of FIGS. 8-10 may understood without referring to the 500 series reference numerals of FIG. 11 without loss of understanding. For this reason, the 500 series reference numerals are enclosed in parentheses in the discussion of FIGS. 8-10.

FIG. 8 illustrates the startup steps for one embodiment of the invention, with an IPL or boot step shown at 402. After IPL step 402, a system job (512) can be created in step 404 to handle and log the problem or "runaway" queries, those queries taking longer than expected. This user job can act as a single point through which the problem query information passes, in some embodiments. After creation, system job (512) can wait to receive a message as shown in step 406.

In step 408, a queue (510) can be created to handle timer messages. In step 410, a plan cache (534) can be created, to contain the various plans which will be generated to handle the queries.

FIG. 9 illustrates one method 412 that can be executed when a query is to be executed. In step 414 a user job (500) begins to execute the DB query. The first time this user job attempts to execute a query, a queue (503) is created in step 416, which will receive runaway query messages, if any are generated. A timed message is created in step 418, and sent to a timer (508) in step 420. In a normal case, with no runaway query, indicated by the "Y" branch from step 422, the timer will be cancelled by the successfully completed query in step 424. In the event there is a runaway query, indicated by the "N" branch from step 422, the timer message is not cancelled, indicated by arrival at step 426.

FIG. 10 illustrates a method 430, which can be executed when step 426 of FIG. 9 is arrived at due to a runaway query. In step 432, the expired timer message is processed through a timed message queue (510) and received by the system job (512), which has been waiting on such a message receipt. The message receipt can be logged in step 434. Some further detailed evaluation (indicated at 514 in FIG. 11) may be performed in some embodiments. If there is indeed a runaway query, then a determination is made in step 436 as to whether a guardian thread already exists. If a guardian thread does not exist, as it normally will not exist, a signal event is generated at step 438 to tell the user job to create the guardian thread. In step 440, the timer message can then be sent to the previously created queue (503), which can retrieve the timer message from the queue (503) and act upon it as discussed further with respect to FIG. 11.

FIG. 11 illustrates an exemplary embodiment of the invention, previously referred to with respect to FIGS. 8-10. As previously discussed, upon IPL, a system job 512, a system timed message queue 510, and a database plan cache 534 can be created. Significant additional system-wide overhead to handle the aspects of the present invention is not created in some embodiments of the present invention.

A user job or application 500 is shown, having a main thread 502. User job 500 typically exists to process DB queries. A user job timer message queue 503 can be created, to handle runaway DB queries, if any arise. A guardian thread 524 is not yet created in some embodiments, as the extra overhead required to launch the secondary thread is wasted on normal DB queries. A query process 504 is executed, to execute the query, for example, an SQL query. Before the execution of the query is begun, a timed message 514 is created at 506 and sent to system timer 508.

The timed messages 514 can be objects which derive from a common base class so system job 512 can process the objects or messages in a polymorphic manner. During database startup, in some embodiments, named message pools can be created for each concrete type of message or object. These pools can perform the function of recycling objects of the same type and can reduce the overhead of running constructors and destructors. The message pools can create new messages on demand up to some high water mark based on system activity.

The message can be an object which includes instructions as to what to do should the timer expire. The time entered in the timer is related to the estimated completion time of the physical plan to be executed, in many embodiments. The timer may be the estimated completion time adjusted upward by a percentage and/or an absolute amount of time, depending on the embodiment. The scheduled message is one example of a system timer, used in this example. Other timers may be used in other embodiments. The system timer functionality is indicated at 508, which can receive and handle the timer message 514 and later enqueue the timer message, if required, on queue 510.

The query execution can be begun at 520. When the query is normally completed, the timed message can be cancelled as indicated at 532. This will cancel the timed message function to make sure that the message is not sent.

If the timer expires, timer 508 has the ID of the queue to send the timed message to. So, timer 508 can send timed message 514 to system queue 510. As system job 512 was waiting on a receive, system job 512 wakes up, logs the received message to a log file, and pushes the (doit) method within message (object) 514, as indicated at 513. The thread of control can come into the doit method in the watcher object 514, which can hold user job 500 safely; to see if it is the same message the same query is running. If so, then a runaway query message can be en-queued on queue 503. The method can also test to determine if guardian thread 524 currently exists. The guardian thread will not normally exist until needed to handle a runaway query.

In some embodiments, an event handler will be registered so that other jobs can asynchronously notify this job to perform some action. The initial uses of events can be: (1) Tell the user job to spawn a guardian thread and interrogate the maintenance queue for a specific action to perform; (2) Tell the user job to conditionally (only if the current plan has not reached the point of no return) cancel the current SQL plan and restart the query using a new plan found in plan cache 534. In such embodiments, if guardian thread 524 does not exist, then the do it method in watcher object 514 can raise an event for user job 500 to cause the creation of the guardian thread.

An event is used for signaling in some embodiments, as it can be looked at when the user job is at a quiesce point. That event, which can be generated in object or message 514, is the indication, handled by an event handler 522, that guardian thread 524 should be started. Thus, a secondary thread, guardian thread 524 is started, which will receive a message from queue 503. In some embodiments, a runaway message was constructed by a method of object 514 and enqueued on queue 503. This message can be a message that will tell the guardian thread that we need to re-optimize, because we have a runaway query.

Guardian thread 524 can do a receive message as indicated within object 524. The guardian thread can do a receive message, and doit method 527 within object 526 can be executed. Now, with guardian thread 524, we can analyze the running query, and determine if there is a problem. The method can analyze the running query, and determine if there is in fact a problem. When problem detection is triggered, the currently executing plan can be interrogated (by the secondary thread) to identify potentially volatile constructs. Examples of volatile constructs, also referred to as risky constructs or risky parts of plans, include use of techniques that restrict join order optimization such as ORDER BY/GROUP BY Pushdown, or lack of consideration for more complex star join processing techniques. These constructs are likely to be the cause of why the query is not completing as expected. Information about the problem may also be placed in a history log, job log or other logging mechanism.

If there is a problem, the currently running plan can be re-costed or otherwise marked as risky or long running. The re-costing process in the query job can occur in a secondary thread so as not to interfere with the executing plan (to minimize disruption should the plan ultimately complete). During the re-costing process, potential plans that contain these constructs will either not be considered as part of the plan space or forced to be reconsidered, as applicable. In some embodiments, risky constructs or risky parts of the plan that were used in the problem query can be removed from consideration from future executions of at least this query, and the query re-costed and re-optimized, given the new information.

At the completion of the re-costing process, the new plan can be enlisted in a plan cache with an indication that this new plan should be considered over the original plan that was already in the cache. At this point the progress of the originally chosen plan can be interrogated to see if it has yet reached the 'Point of No Return.' If the database still has the freedom to replace the currently executing plan and it is viewed that this plan still has a significant amount of processing to reach completion, the database engine can be interrupted so as to replace the current plan executable with the re-optimized plan executable and re-start the execution.

Referring again to FIG. 11, the selection of physical plans can be made again, with another plan selected from database plan cache 524. The newly selected executable plan can be put into place and a signal sent at 528, to restart the query, as indicated at 530.

Note that this restart can be done at a low level in the query processing such that the user is not aware of the change. In another embodiment, the secondary thread may choose to make environmental changes to help the currently executing plan based on its intimate query plan knowledge. For example, it may fully load some object (index or table) into RAM which the query is faulting on, add hardware resources (CPU, RAM) with corresponding tweaks to the running plan (versus full reoptimizations) so the plan can take advantage of the resource, rebuild and replace a hash table based on observed cardinalities, or migrate the task to another CPU or NODE, for example if a remote NODE is querying/updating the same tables.

Note that while there are techniques to extend the 'Point of No Return' by tracking already returned records, in practice this is not always necessary. Most problem queries have a basic signature that they run for a considerable amount of time before returning any records. Also, query results are normally buffered such that many records are put into the user buffer before control is returned by the database. Consequently the window up to the point of no return is quite large for problem queries and often more than sufficient to detect and correct the problem. Exemplary embodiments of the present invention are described largely in the context of SQL. This is for ease of explanation and not for limitation. Optimizing database queries is not limited to SQL. In fact, other query languages exist such as XML, QRY/400, Open Query File ('OPNQUERYF'), DLL and the database queries may include queries of all such query languages and many others as will occur to those of skill in the art.

Exemplary embodiments of the present invention are described largely in the context of a fully functional computer system for processing database queries. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for managing execution of a database query for execution on a computer, the method comprising:
    initiating execution of a first query plan for executing the database query on the computer;
    stopping execution of the first query plan;
    selecting a second query plan where the second query plan already existed;
    initiating execution of the second query plan for executing the database query on the computer, responsive to the first query plan taking too long to complete; and
    executing a thread to supervise stopping the first query plan execution and the initiating the second query plan execution, where the thread is created responsive to the first query plan taking too long to complete.

2. The method of claim 1, further comprising setting a timer having a time related to an expected execution time of a first query plan for executing the database query, in which the first query plan taking too long to complete is determined at least in part by the timer timing out.

3. The method of claim 2, in which setting the timer includes making a call to an operating system timer function.

4. The method of claim 2, in which the timer is deactivated responsive to completion of the first query plan completion.

5. The method of claim 1, further comprising removing at least part of the first plan from future consideration to execute the database query.

6. The method of claim 1, further comprising identifying and removing at least one problem construct used in the first plan from future consideration to execute the database query.

7. The method of claim 1, in which the second plan is selected from a set of plans, the method further comprising:
    searching the first plan to identify at least one problem construct; and
    revising the set of plans responsive to the at least one found problem construct prior to selecting the second plan from the set of plans.

8. The method of claim 1, in which functionality to handle queries taking too long to complete creates an additional processing overhead even for non-problem query processing, in which the additional processing overhead for executing each non-problem query includes creating and sending a timer message and canceling a timer.

9. The method of claim 1, in which functionality to handle queries taking too long to complete creates an additional processing overhead even for non-problem query processing, in which the additional processing overhead for executing each non-problem query consists essentially of creating and sending a timer message and canceling a timer.

10. A computer system for processing database queries, the system comprising a computer processor, a computer memory operatively coupled to the computer processor, the computer memory having disposed within it computer program instructions capable of:
    initiating execution of a first query plan for executing the database query on the computer system;
    selecting a second query plan where the second query plan already existed;
    stopping execution of the first query plan and initiating execution of a second query plan for executing the database query on the computer system, responsive to the first query plan taking too long to complete; and
    executing a thread to supervise stopping the first query plan execution and the initiating the second query plan execution, where the thread is created responsive to the first query plan taking too long to complete.

11. The system of claim 10 wherein the computer program instructions further comprise computer program instructions capable of:
    setting a timer having a time related to an expected execution time of the first query plan for executing the database query, in which the first query plan taking too long to complete is determined at least in part by the timer timing out.

12. The system of claim 10 wherein the computer program instructions further comprise computer program instructions capable of:
    searching the first plan to identify at least one problem construct; and
    not selecting as the second plan to execute, any plan containing the at least one identified problem construct.

13. A computer program product for processing database queries, the computer program product disposed in a recordable computer readable signal bearing medium, the computer program product comprising computer program instructions capable of:
    initiating execution of a first query plan for executing the database query;
    stopping execution of the first query plan;
    selecting a second query plan where the second query plan already existed;
    initiating execution of a second query plan for executing the database query, responsive to the first query plan taking too long to complete; and
    executing a thread to supervise stopping the first query plan execution and the initiating the second query plan execution, where the thread is created responsive to the first query plan taking too long to complete.

14. The computer program product of claim 13 wherein the computer program instructions further comprise computer program instructions capable of:
    searching the first plan to identify at least one problem construct; and not selecting as the second plan to execute, any plan containing the at least one identified problem construct.

15. The computer program product of claim 13, wherein the computer program instructions further comprise computer program instructions capable of making a call to an operating system timer function to set a timer to determine that the first query plan is taking too long to complete.

16. The computer program product of claim 13, in which processing queries taking too long to complete creates an additional processing overhead even for non-problem query processing, in which the additional processing overhead for executing each non-problem query comprises computer program instructions capable of creating and sending a timer message and canceling a timer.

17. The computer program product of claim 13, in which processing queries taking too long to complete creates an additional processing overhead even for non-problem query processing, in which the additional processing overhead for executing each non-problem query consists essentially of computer program instructions capable of creating and sending a timer message and canceling a timer.

* * * * *